US009125209B2

(12) United States Patent
Mahmoud et al.

(10) Patent No.: US 9,125,209 B2
(45) Date of Patent: Sep. 1, 2015

(54) METHOD TO REPORT CQI IN CONNECTED-MODE DRX AND REDUCE UE WAKE UP TIME FOR 3GPP LONG TERM EVOLUTION (LTE) SYSTEMS

(71) Applicant: QUALCOMM Incorporated, San Diego, CA (US)

(72) Inventors: Hisham A. Mahmoud, San Diego, CA (US); Supratik Bhattacharjee, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 13/789,656

(22) Filed: Mar. 7, 2013

(65) Prior Publication Data

US 2014/0022909 A1 Jan. 23, 2014

Related U.S. Application Data

(60) Provisional application No. 61/673,169, filed on Jul. 18, 2012.

(51) Int. Cl.
*G01R 31/08* (2006.01)
*H04W 76/04* (2009.01)
*H04L 1/00* (2006.01)

(52) U.S. Cl.
CPC ........... *H04W 76/048* (2013.01); *H04L 1/0026* (2013.01); *H04L 1/0027* (2013.01)

(58) Field of Classification Search
CPC ............................ H04W 76/048; H04W 76/04
USPC ....................................................... 370/241
See application file for complete search history.

(56) References Cited

U.S. PATENT DOCUMENTS

| | | | |
|---|---|---|---|
| 7,724,697 B2 | 5/2010 | Dalsgaard et al. | |
| 8,121,045 B2 | 2/2012 | Cai et al. | |
| 2007/0287468 A1* | 12/2007 | Jeong et al. | 455/452.2 |
| 2009/0232118 A1 | 9/2009 | Wang et al. | |
| 2010/0137013 A1* | 6/2010 | Ren | 455/500 |
| 2010/0197316 A1 | 8/2010 | Aoyama et al. | |
| 2010/0208640 A1 | 8/2010 | Cheng et al. | |
| 2011/0038277 A1 | 2/2011 | Hu et al. | |
| 2013/0308510 A1* | 11/2013 | Ji et al. | 370/311 |

FOREIGN PATENT DOCUMENTS

EP 2280576 A1 2/2011

OTHER PUBLICATIONS

International Search Report and Written Opinion—PCT/US2013/047389—ISA/EPO—Sep. 16, 2013.

* cited by examiner

*Primary Examiner* — Dang Ton
*Assistant Examiner* — Abdeltif Ajid
(74) *Attorney, Agent, or Firm* — Arent Fox LLP

(57) ABSTRACT

A method, an apparatus, and a computer program product for wireless communication are provided. The apparatus determines whether a channel quality indicator (CQI) is to be reported during any one of x subframes immediately after a start of a next on-duration, an on-duration being a duration over which a downlink control channel is monitored every discontinuous reception (DRX) cycle, and x being a number of subframes used to generate a CQI report, schedules a wake-up time for reporting the CQI when the CQI is to be reported during any one of the x subframes immediately after the start of the next on-duration, and reports the CQI based on a reference subframe. The CQI may be based on a last subframe of a previous DRX cycle active time, and reported at a first subframe of the next on-duration.

20 Claims, 11 Drawing Sheets

FIG. 8

METHOD TO REPORT CQI IN CONNECTED-MODE DRX AND REDUCE UE WAKE UP TIME FOR 3GPP LONG TERM EVOLUTION (LTE) SYSTEMS

CROSS-REFERENCE TO RELATED APPLICATION(S)

This application claims the benefit of U.S. Provisional Application Ser. No. 61/673,169, entitled "A METHOD TO REPORT CQI IN CONNECTED-MODE DRX AND REDUCE UE WAKE UP TIME FOR 3GPP LONG TERM EVOLUTION (LTE) SYSTEMS" and filed on Jul. 18, 2012, which is expressly incorporated by reference herein in its entirety.

BACKGROUND

1. Field

The present disclosure relates generally to communication systems, and more particularly, to reporting channel quality information (CQI) while in a connected discontinuous reception (DRX) mode and reducing a user equipment (UE) wake up time.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

A user equipment (UE) should be awake as little as possible in order to conserve battery life. In a discontinuous reception (DRX) mode, it is desirable for the UE to wake up as late as possible in order to monitor for downlink signals. Generally, the UE must consider waking early enough to monitor a downlink channel a given number of subframes before a first subframe of a next on-duration in case a periodic CQI report is to be transmitted at the first subframe of the next on-duration. However, to further delay the UE wake up, when the periodic CQI report is scheduled to be transmitted at the first subframe of the next on-duration, CQI measurements of a last subframe of a previous DRX cycle active time may be used as a basis for reporting the CQI at the first subframe of the next on-duration if certain conditions exist. Doing so allows for a shorter UE awake duration resulting in reduced power consumption.

In an aspect of the disclosure, a method, a computer program product, and an apparatus are provided. The apparatus determines whether a channel quality indicator (CQI) is to be reported during any one of x subframes immediately after a start of a next on-duration, wherein an on-duration is a duration over which a downlink control channel is monitored every discontinuous reception (DRX) cycle and x is a number of subframes used to generate a CQI report. The apparatus further schedules a wake-up time for reporting the CQI when the CQI is to be reported during any one of the x subframes immediately after the start of the next on-duration, and reports the CQI based on a reference subframe.

BRIEF DESCRIPTION OF THE DRAWINGS

FIG. 8 is a diagram illustrating a UE wake-up timeline considering a CQI-Restart mode and a CQI-Resume mode.

DETAILED DESCRIPTION

Figure 1:
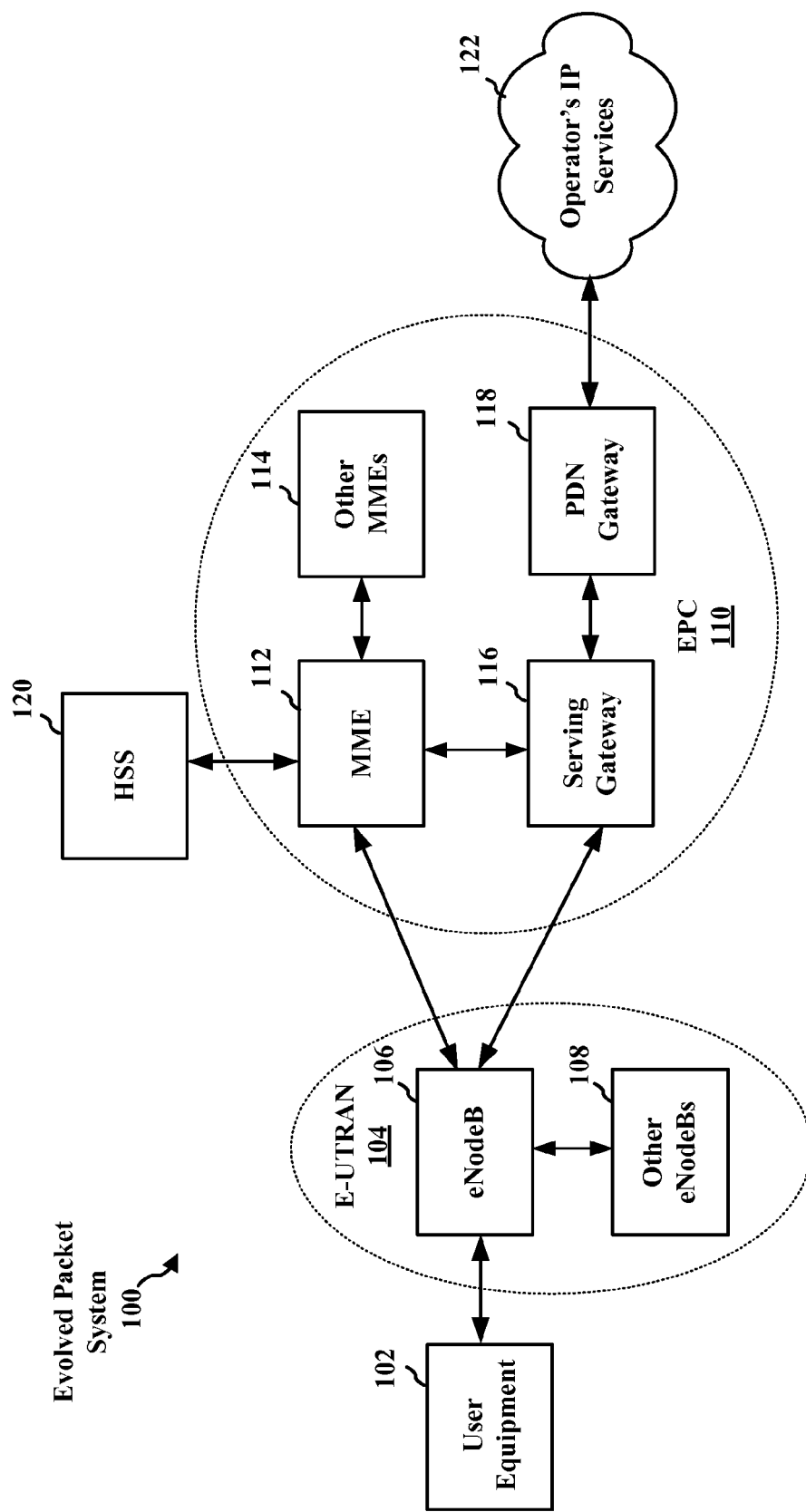
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 is the source of MBMS traffic. The MBMS Gateway 124 distributes the MBMS traffic to the eNBs 106, 108.

Figure 2:
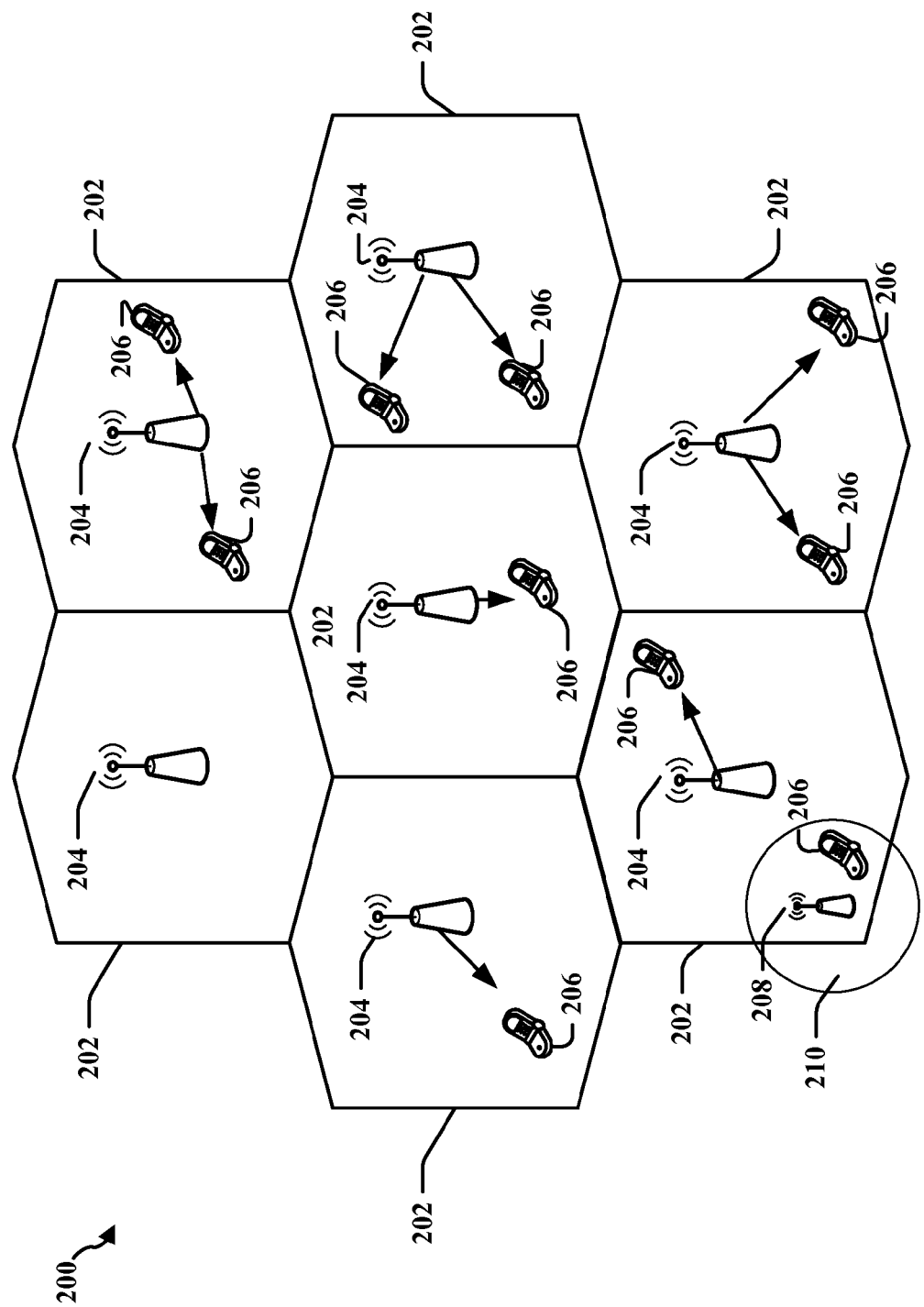
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
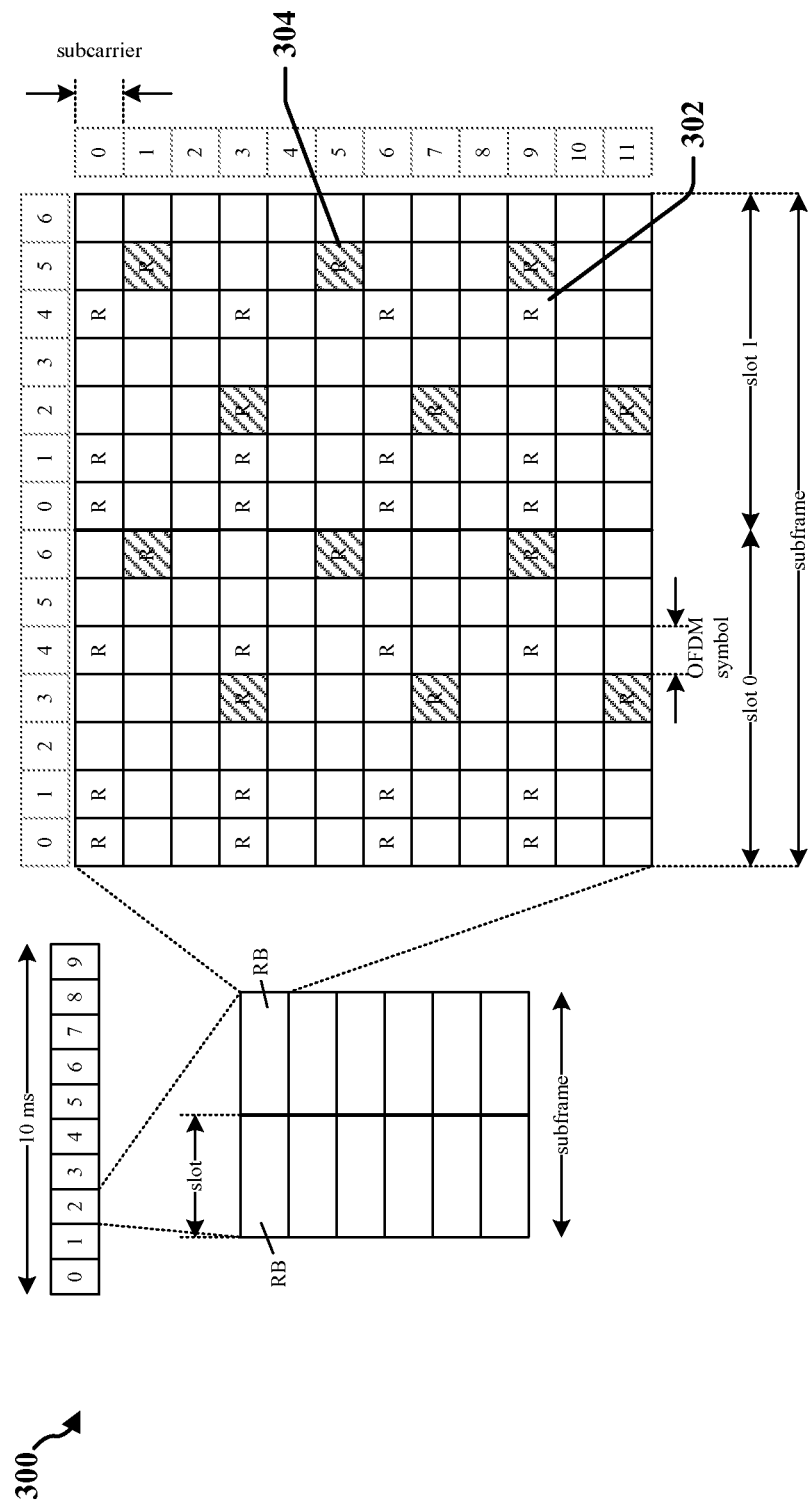
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
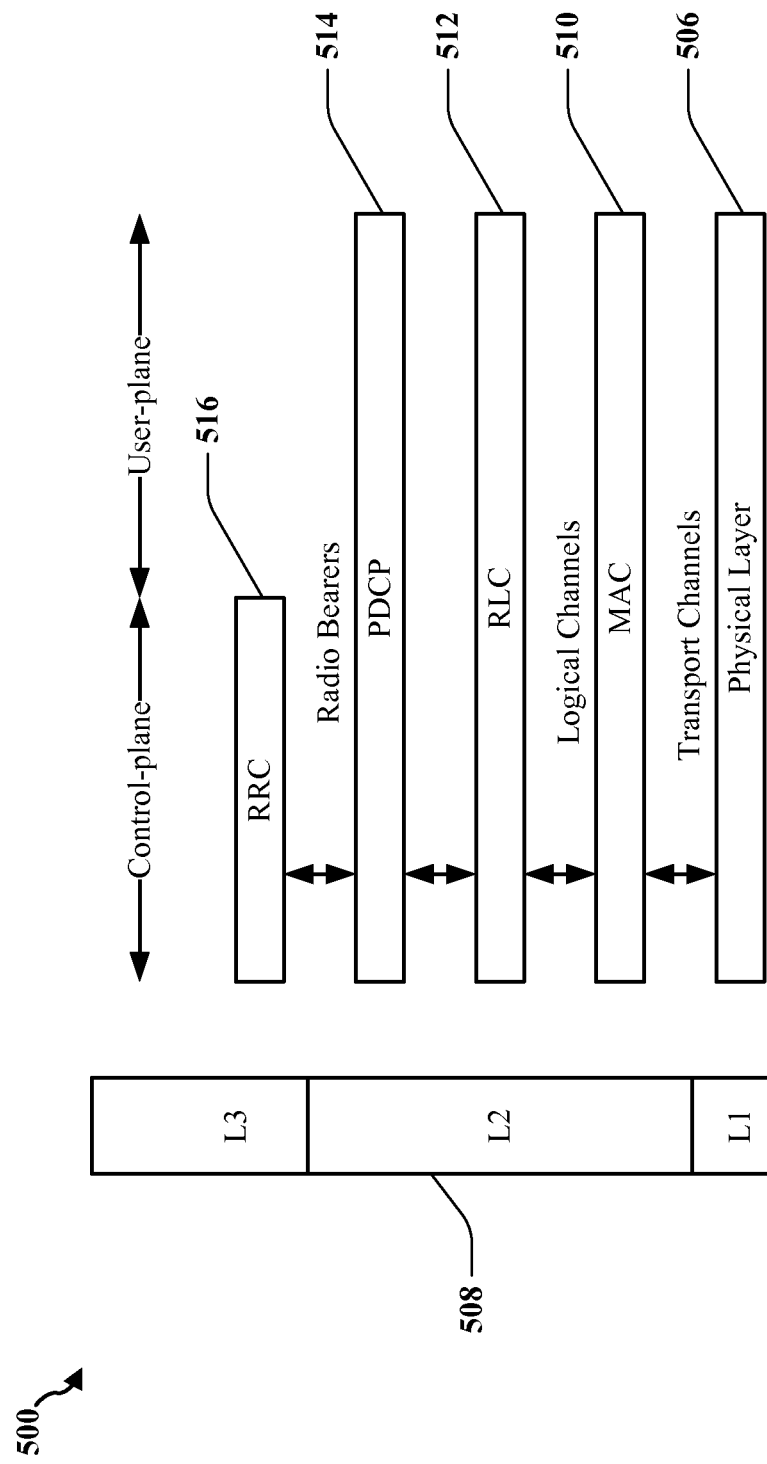
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
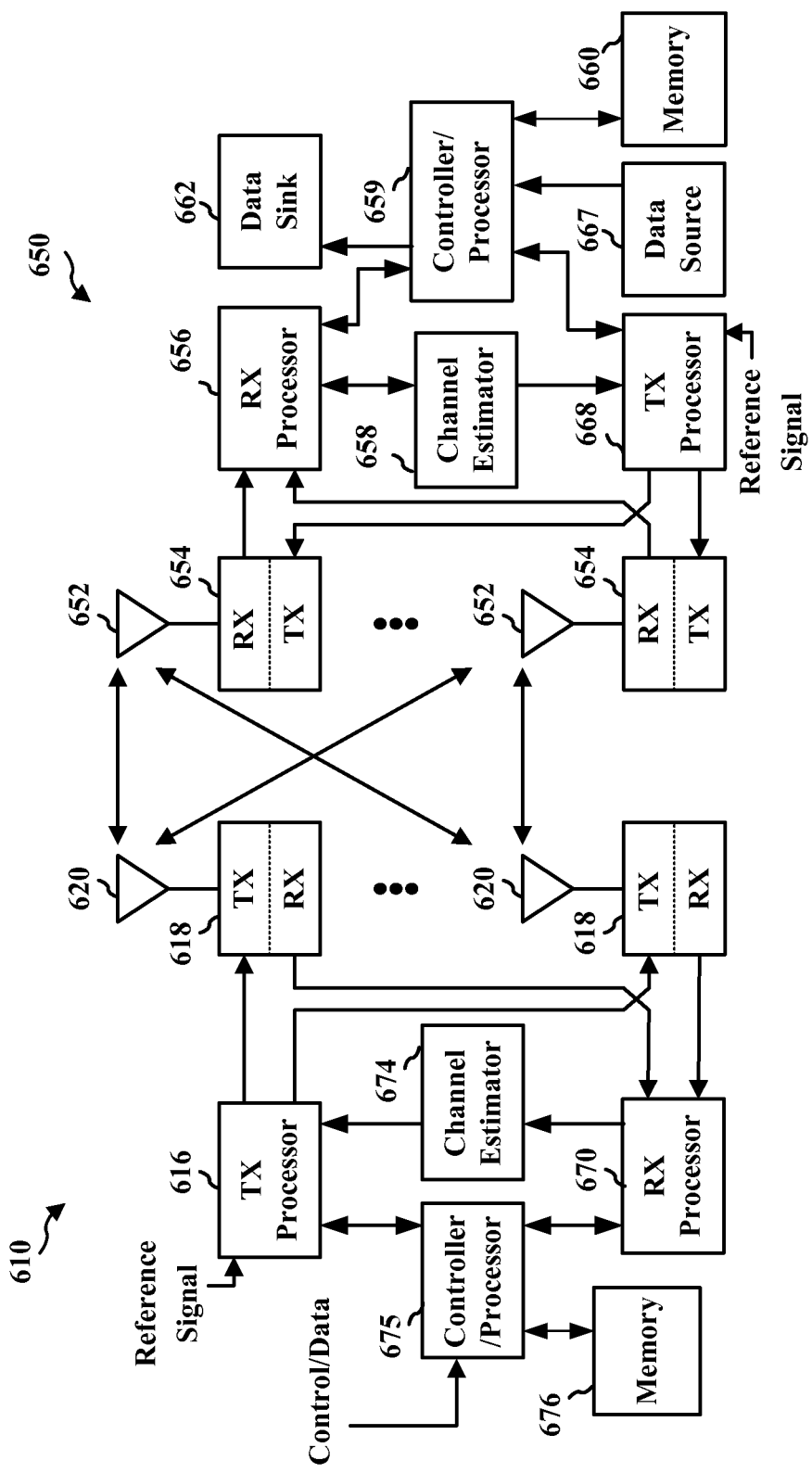
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
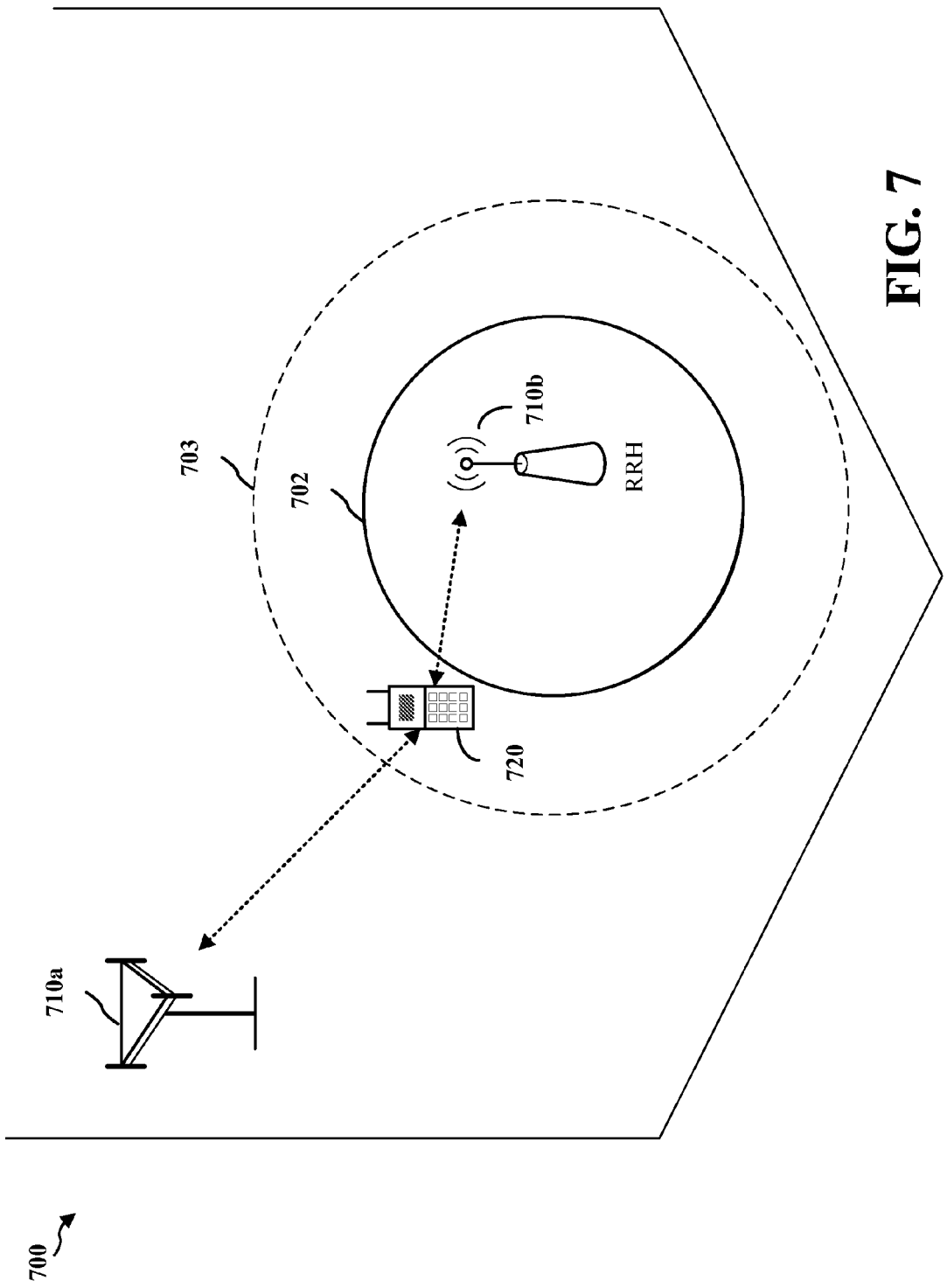
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710*b* and the macro eNB 710*a* and through interference cancelation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

In an aspect, LTE connected mode discontinuous reception (DRX) timelines may be optimized at the UE by considering differences in channel state information (CSI) configurations. Accordingly, UE power consumption may also be optimized.

The UE may be required to intermittently send CSI to the eNB to ensure proper closed loop operation between the UE and the network (NW). The CSI may include one or more of the following: 1) channel quality indicator (CQI); 2) precoding matrix indicator (PMI); and 3) rank indicator (RI). The PMI is applicable to closed loop spatial multiplexing modes. The RI is applicable to closed and open loop spatial multiplexing modes.

An example list of modulation schemes and code rates which can be signaled by means of a CQI value is shown in Table 1 below.

TABLE 1

| CQI Index | Modulation | Approximate code rate | Efficiency (information bits per symbol) |
|---|---|---|---|
| 0 | Out-of-range | — | — |
| 1 | QPSK | 0.076 | 0.1523 |
| 2 | QPSK | 0.12 | 0.2344 |
| 3 | QPSK | 0.19 | 0.3770 |
| 4 | QPSK | 0.3 | 0.6016 |
| 5 | QPSK | 0.44 | 0.8770 |
| 6 | QPSK | 0.59 | 1.1758 |
| 7 | 16QAM | 0.37 | 1.4766 |
| 8 | 16QAM | 0.48 | 1.9141 |
| 9 | 16QAM | 0.6 | 2.4063 |
| 10 | 64QAM | 0.45 | 2.7305 |
| 11 | 64QAM | 0.55 | 3.3223 |
| 12 | 64QAM | 0.65 | 3.9023 |
| 13 | 64QAM | 0.75 | 4.5234 |
| 14 | 64QAM | 0.85 | 5.1152 |
| 15 | 64QAM | 0.93 | 5.5547 |

Referring to Table 1, the CQI index is an index corresponding to a channel coding rate and a modulation scheme. The UE may be required to report the CQI as the highest index (i.e., the highest combination of code rate and modulation scheme), which when translated to a transport block size and modulation scheme and received on the DL PDSCH using a set of time/frequency reference resources, ensures a block error rate (BLER) of less than 10% based on a measured received signal quality.

CQI reporting may be configured to be periodic, aperiodic, or both by the eNB. For aperiodic CQI reporting, the UE is instructed by the eNB to send the CQI report at least four subframes prior to the subframe at which the UE is to send the CQI report. For periodic CQI reporting, the UE is semi-statically configured by higher layers to periodically feedback CQI reports. Both CQI reporting modes may be configured with a discontinuous reception (DRX) mechanism. In either case, the UE may measure downlink reception quality at a subframe, and send an uplink transmission of CQI based on the measurement at a time four milliseconds (4 ms) after the subframe at which the downlink reception quality was measured.

DRX is a mechanism for providing a balance between conserving power and maintaining continuous reception coverage at the UE. The DRX mechanism enables the UE to go to sleep at predetermined periodic intervals without losing reception coverage, thereby achieving significant savings in power consumption at a negligible cost of coverage.

DRX may be configured in both an idle mode and a connected mode. In idle mode DRX, the UE does not have a dedicated connection with the network, and waits to receive pages from the network for an incoming call, or waits for a user to make an outgoing call. The UE is allowed to sleep for a predetermined time and wakes up at specific intervals where it expects to receive pages. DRX configuration parameters including a duty cycle are cell-specific and carried over system information (SI) messages from the network. A UE-specific DRX configuration, which if signaled, may override the cell-specific configuration.

In connected mode DRX, the UE has a dedicated connection with the network. Based on certain triggers (e.g., UL/DL traffic activity, application type, etc.), the network may choose to configure a DRX duty cycle. The DRX duty cycle used in connected mode DRX may generally be shorter than the duty cycle used in idle mode DRX, but may be as long as the idle mode DRX duty cycle. The UE is allowed to sleep for a predetermined periodic interval and wakes up at specific intervals to demodulate a physical downlink control channel (PDCCH). Furthermore, in comparison to idle mode DRX, the connected mode DRX UE may be required to perform additional tasks upon waking, such as CSI feedback, uplink traffic transmission, etc.

When DRX is configured, periodic CQI reports may be sent by the UE during an "active-time." The RRC can further restrict periodic CQI reports so that they are only sent during an "on-duration." The on-duration is defined by a higher layer and is a minimum duration (in sub-frames or milliseconds) over which the UE is to monitor a downlink control channel every DRX cycle. The DRX cycle length is also defined by the higher layer. The active-time is a duration of time the UE monitors the downlink control channel and is usually equal to or longer than the on-duration. Accordingly, description herein may be limited to DRX on-duration as aspects described with respect to DRX on-duration also applies to DRX active-time.

To consume less battery power in DRX mode, the UE should be awake to process signals for as short a time as possible. Hence, the UE waking up as late as possible is desirable. However, the UE must wake early enough to monitor the downlink channel starting at the first subframe within the on-duration. Additionally, if a periodic CQI report is scheduled for transmission at the first subframe of the on-duration, the UE must wake to process downlink information x milliseconds/subframes prior to the first subframe of the on-duration, wherein x is a number of milliseconds/subframes used to generate a CQI report. For example, the value of x may be greater than or equal to 4.

In the above example, the UE must wake an extra x milliseconds before the start of the on-duration to account for a worst-case scenario where the periodic CQI report is scheduled for transmission at the first subframe of the on-duration. This extends the UE awake duration by an extra x milliseconds, which is only needed when the periodic CQI report is scheduled, and when the periodic CQI report is to be transmitted during the first subframe of the on-duration.

In an aspect, when periodic CQI is scheduled to be reported at the first subframe of an on-duration of a current DRX cycle, CQI measurements from a last subframe of a previous DRX cycle active time may be used as the basis for reporting the CQI at the first subframe of the on-duration, if certain conditions are met. This mode of reporting CQI may be referred to as "Resume-CQI."

If the certain conditions for reporting Resume-CQI are not met, the UE wakes up x subframes prior to the first subframe of the on-duration to monitor the downlink channel and report CQI measurements at the first subframe of the on-duration. This mode of reporting may be referred to as "Restart-CQI."

The conditions for reporting Resume-CQI include:

1) Periodic CQI is scheduled to be reported at one of the first x subframes of the on-duration;

2) Sufficient off-period exists between two DRX wakeups over which CQI is resumed (i.e., off-period is longer than x subframes+warm-up overhead); and 3) Off-period between the two DRX wakeups is shorter than y subframes, where y is a maximum time allowed between a CQI measurement and a CQI report.

Condition 3) above ensures that the reported CQI value is not so old that it is irrelevant with respect to an actual channel condition. A simplification of condition 3) may be implemented by considering a DRX cycle instead. For example, a Resume-CQI mode may be used when the DRX cycle is 40 ms or less. This guarantees the UE off-period to be less than 40 ms regardless of the active time.

Figure 8:
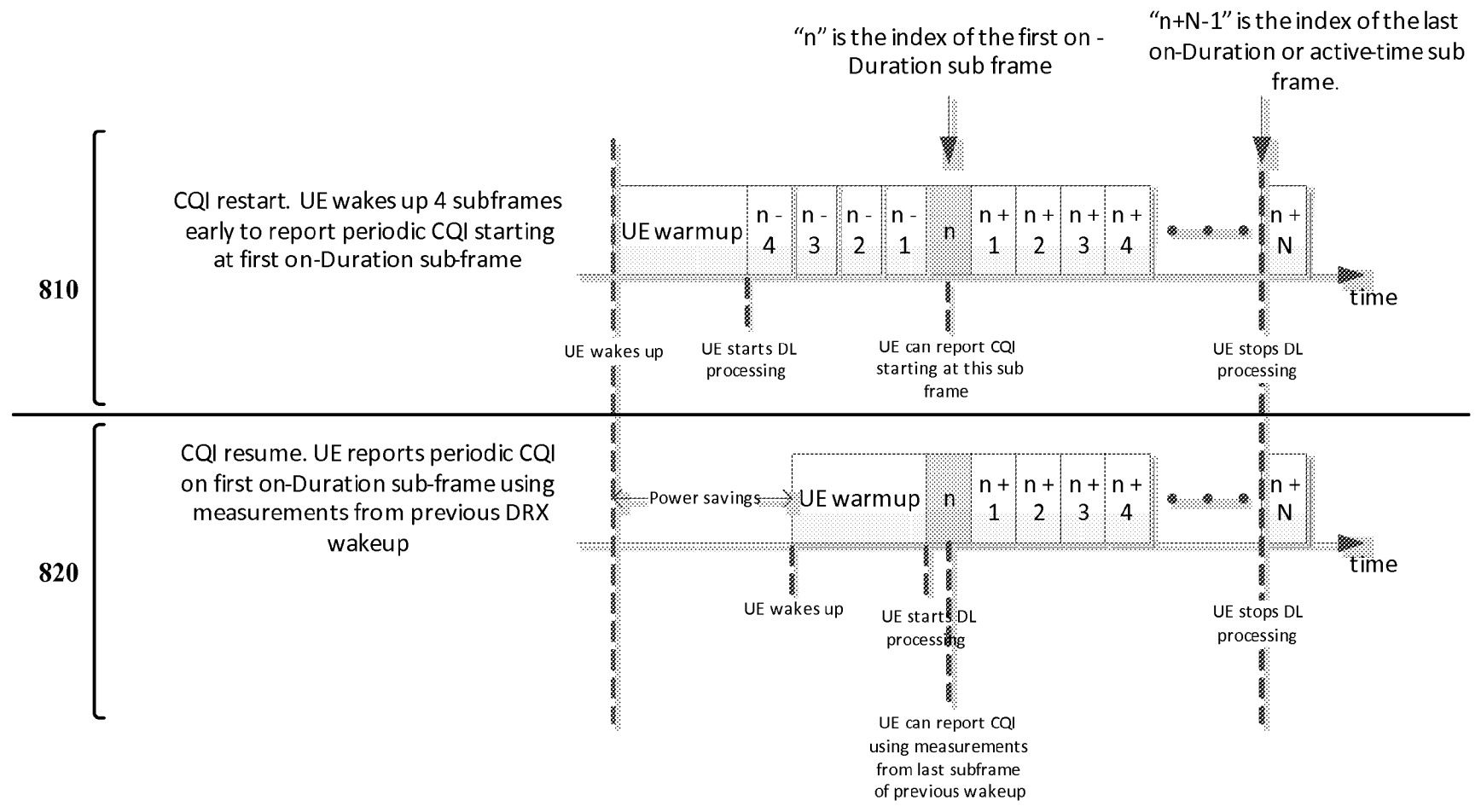

FIG. 8 is a diagram 800 illustrating a UE wake-up timeline considering a CQI-Restart mode and a CQI-Resume mode. Referring to FIG. 8, "n" corresponds to the index of the first subframe of the on-duration and "n+N−1" corresponds to the index of the last subframe of the on-duration or active-time. As an example, a duration of four subframes is used to generate a CQI report.

The CQI-Restart mode is depicted at 810. Here, the UE may periodically report CQI starting at the first subframe of the on-duration (subframe n). This scheme may be employed when the conditions for implementing a CQI-Resume mode are not satisfied. Accordingly, the UE schedules to wake at a predetermined time, taking into account a warm-up duration, in order to begin processing downlink information at subframe n−4, which is four subframes prior to the first subframe of the on-duration. By beginning to process at the subframe n−4, the UE can process downlink information for the amount of time (e.g., four subframes) for generating the CQI report in order to send the CQI report starting at subframe n. At the last subframe of the on-duration or active-time, the UE ceases to process downlink information.

The CQI-Resume mode is depicted at 820. Here, the UE may periodically report CQI starting at the first subframe of the on-duration (subframe n). This scheme may be employed when the conditions discussed supra are satisfied. In the CQI-Resume mode, the UE may use CQI measurements from a last subframe of a previous DRX cycle active time as the basis for reporting the CQI at subframe n. Unlike the UE utilizing the CQI-Restart mode at 810, when scheduling to wake, the UE of the CQI-Resume mode does not to have to begin processing downlink information at the subframe n−4 to generate a CQI report. Thus, the UE of the CQI-Resume may only consider the warm-up duration in order to generate and send the CQI report at the subframe n.

Notably, by not having to begin processing downlink information at the subframe n−4 to generate the CQI report, the UE utilizing the CQI-Resume mode may wake later in time as compared to the CQI-Restart mode depicted at 810. Thus, compared to the mode at 810, the UE utilizing the CQI-Resume mode at 820 saves a considerable amount of power due to the UE being able to use CQI measurements of a previous DRX cycle active time to report CQI at the start of a next on-duration.

Figure 9:
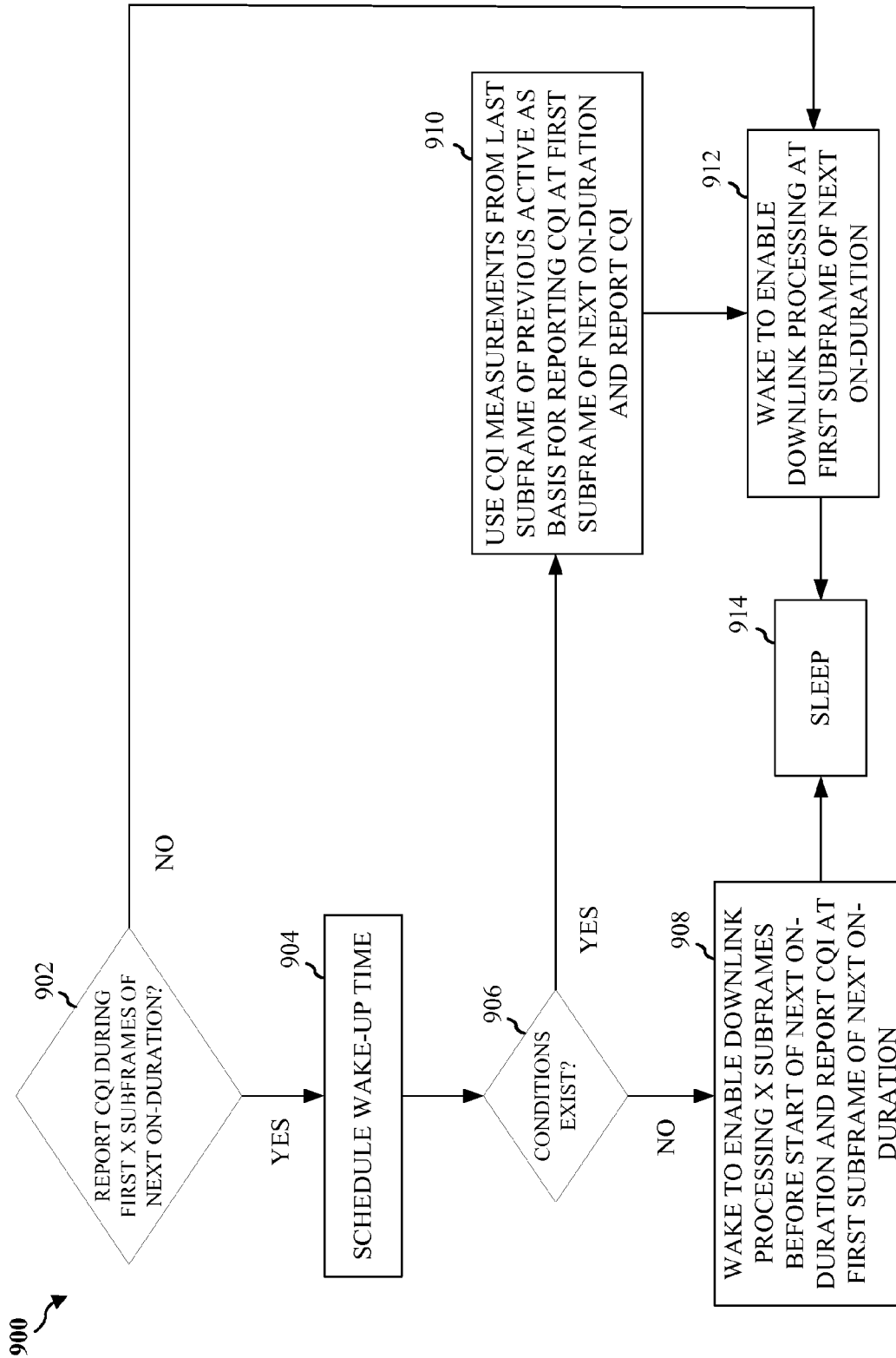
FIG. 9 is a flow chart of a method of wireless communication.

FIG. 9 is a flow chart 900 of a method of wireless communication. The method may be performed by a UE at the end of an active time before the UE sleeps. At step 902, the UE determines whether a channel quality indicator (CQI) is to be reported during any one of x subframes immediately after a start of a next on-duration. The UE may make this determination based on reporting requirements received from a base station or eNB. In an aspect, an on-duration is a duration over which a downlink control channel is monitored every discontinuous reception (DRX) cycle. Moreover, x is a number of subframes used to generate a CQI report.

At step 912, when the CQI is determined not to be reported during any one of the x subframes immediately after the start of the next on-duration, the UE schedules to wake to enable processing of downlink information at a first subframe of the next on-duration.

At step 904, the UE schedules a wake-up time for reporting the CQI when the CQI is to be reported during any one of the x subframes immediately after the start of the next on-duration. At step 906, the UE determines whether conditions related to the scheduled wake-up time exist for implementing a Resume-CQI mode. The conditions include: 1) the scheduled wake-up time is greater than a sum of x and a predetermined warm-up duration; and 2) the scheduled wake-up time is less than y, wherein y is a maximum time allowed between a CQI measurement and the CQI report.

At step 910, when the conditions exist, the UE reports the CQI based on a reference subframe. In an aspect, the reference subframe is a last subframe of a previous DRX cycle active time. Therefore, the UE may report the CQI based on the reference subframe when the conditions exist by using a CQI measurement from the last subframe of the previous active time as a basis to report the CQI. Thereafter, at step 912, the UE may schedule to wake to enable processing of downlink information at a first subframe of the next on-duration, and report the CQI based on the CQI measurement from the last subframe of the previous active time at the first subframe of the next on-duration. At step 914, the UE proceeds to sleep after scheduling a time to wake.

At step 908, when the conditions do not exist, the UE implements a Restart-CQI mode. Accordingly, the UE schedules to wake to enable processing of downlink information at a subframe that is x subframes immediately before the start of the next on-duration, and report the CQI based on the processed downlink information at the first subframe of the next on-duration. Thereafter, at step 914, the UE proceeds to sleep after scheduling the time to wake.

Figure 10:
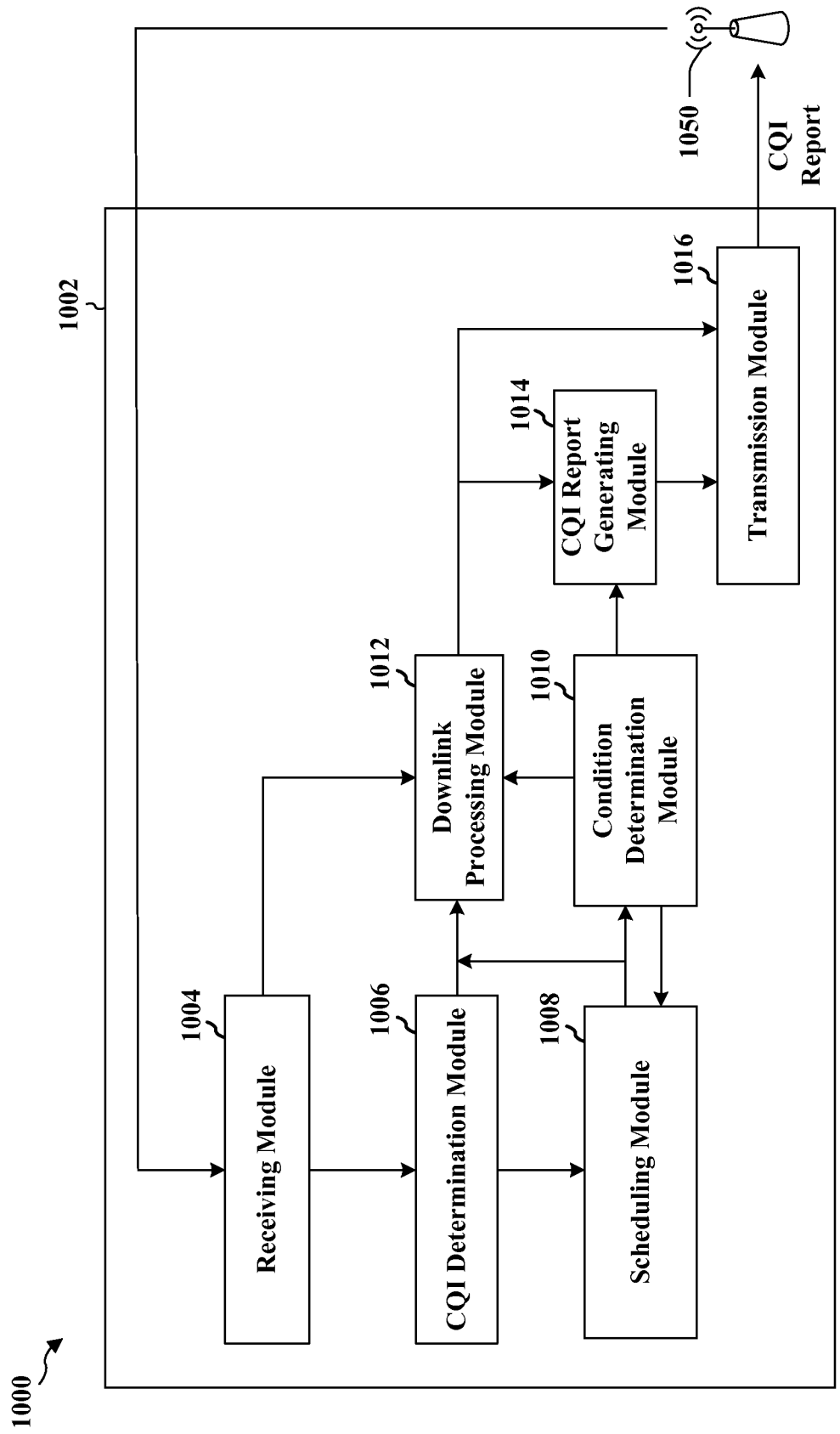
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE at the end of an active time before the UE sleeps. The apparatus includes a receiving module 1004, a CQI determination module 1006, a scheduling module 1008, a condition determination module 1010, a downlink processing module 1012, a CQI report generating module 1014, and a transmission module 1016.

The CQI determination module 1006 determines whether a channel quality indicator (CQI) is to be reported during any one of x subframes immediately after a start of a next on-duration. The CQI determination module 1006 may make this determination based on reporting requirements received from a base station or eNB 1050 via the receiving module 1004. In an aspect, an on-duration is a duration over which a downlink control channel is monitored every discontinuous reception (DRX) cycle. Moreover, x is a number of subframes used to generate a CQI report.

When the CQI is determined not to be reported during any one of the x subframes immediately after the start of the next on-duration, the scheduling module 1008 schedules to wake to enable the downlink processing module 1012 to process downlink information at a first subframe of the next on-duration.

When the CQI is to be reported during any one of the x subframes immediately after the start of the next on-duration, the scheduling module 1008 schedules a wake-up time for reporting the CQI. The condition determination module 1010 determines whether conditions related to the scheduled wake-up time exist for implementing a Resume-CQI mode. The conditions include: 1) the scheduled wake-up time is greater than a sum of x and a predetermined warm-up duration; and 2) the scheduled wake-up time is less than y, wherein y is a maximum time allowed between a CQI measurement and the CQI report.

When the conditions exist, the CQI report generating module 1014 reports the CQI based on a reference subframe. In an aspect, the reference subframe is a last subframe of a previous DRX cycle active time. Therefore, the CQI report generating module 1014 may report the CQI based on the reference subframe when the conditions exist by using a CQI measurement from the last subframe of the previous active time as a basis to report the CQI. Thereafter, the scheduling module 1008 may schedule to wake to enable the downlink processing module 1012 to process downlink information at a first subframe of the next on-duration, and the CQI report generating module 1014 to report the CQI, via the transmission module 1016, based on the CQI measurement from the last subframe of the previous active time at the first subframe of the next on-duration. The apparatus may proceed to sleep after a time to wake is scheduled.

When the conditions do not exist, the condition determination module 1010 implements a Restart-CQI mode. Accordingly, the scheduling module 1008 schedules to wake to enable the downlink processing module 1012 to process downlink information at a subframe that is x subframes immediately before the start of the next on-duration, and the CQI report generating module 1014 to report the CQI, via the transmission module 1016, based on the processed downlink information at the first subframe of the next on-duration. The apparatus may proceed to sleep after the time to wake is scheduled.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
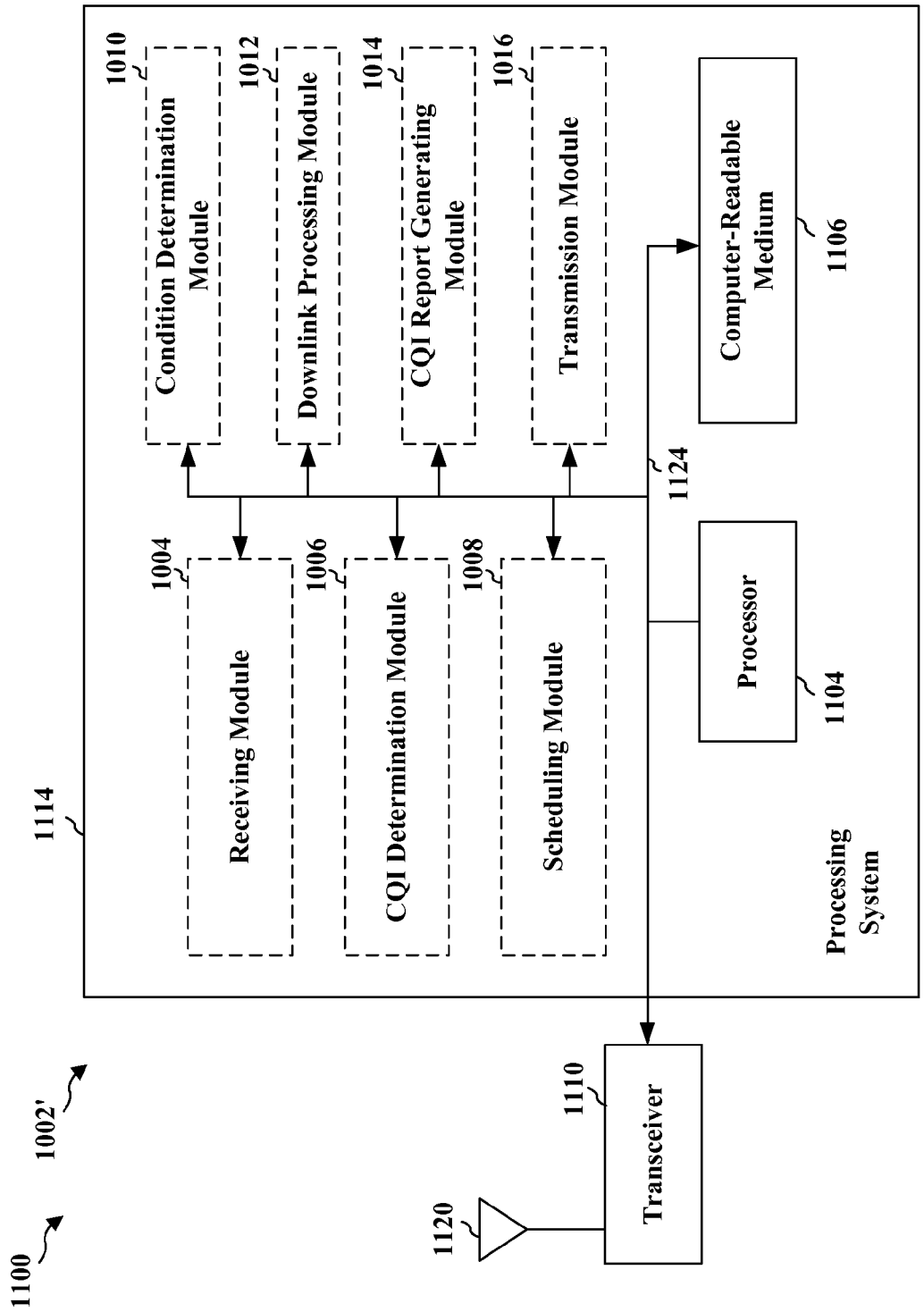
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, 1016, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiving module 1004. In addition, the transceiver 1110 receives information from the processing system 1114, specifically the transmission module 1016, and based on the received information, generates a signal to be applied to the one or more antennas 1120. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, 1012, 1014, and 1016. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for determining whether a channel quality indicator (CQI) is to be reported during any one of x subframes immediately after a start of a next on-duration, an on-duration being a duration over which a downlink control channel is monitored every discontinuous reception (DRX) cycle, and x being a number of subframes used to generate a CQI report, means for scheduling a wake-up time for reporting the CQI when the CQI is to be reported during any one of the x subframes immediately after the start of the next on-duration, means for reporting the CQI based on a reference subframe, means for waking to enable processing of downlink information at a first subframe of the next on-duration when the CQI is determined not to be reported during any one of the x subframes immediately after the start of the next on-duration, means for waking to enable processing of downlink information at a subframe that is x subframes immediately before the start of the next on-duration when the conditions do not exist, means for reporting the CQI based on the processed downlink information at a first subframe of the next on-duration, means for waking to enable processing of downlink information at a first subframe of the next on-duration, and means for reporting the CQI based on the CQI measurement from the last subframe of the previous active time at the first subframe of the next on-duration.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of a wireless communication, comprising:
    determining whether a channel quality indicator (CQI) is to be reported during a first subframe immediately after a start of a next on-duration, an on-duration being a duration over which a downlink control channel is monitored every discontinuous reception (DRX) cycle;
    scheduling a wake-up time for reporting the CQI when the CQI is to be reported during the first subframe immediately after the start of the next on-duration; and
    reporting the CQI based on a reference subframe,
    wherein the CQI is reported based on the reference subframe during the first subframe immediately after the start of the next on-duration when the scheduled wake-up time is greater than a sum of a number of subframes used to generate a CQI report and a predetermined warm-up duration, and less than a maximum time allowed between a CQI measurement and the CQI report.

2. The method of claim 1, further comprising:
    waking to enable processing of downlink information at the first subframe of the next on-duration when the CQI is determined not to be reported during the first subframe immediately after the start of the next on-duration.

3. The method of claim 1, further comprising:
    waking to enable processing of downlink information at a subframe that is a particular number of subframes immediately before the start of the next on-duration when the scheduled wake-up time at least is not greater than the sum of the number of subframes used to generate the CQI report and the predetermined warm-up duration, or is not less than the maximum time allowed between the CQI measurement and the CQI report, wherein the particular number of subframes is equal to the number of subframes used to generate the CQI report; and
    reporting the CQI based on the processed downlink information at the first subframe of the next on-duration.

4. The method of claim 1, wherein the reference subframe is a last subframe of a previous DRX cycle active time, and
    wherein the reporting the CQI based on the reference subframe comprises:
        using a CQI measurement from the last subframe of the previous active time as a basis to report the CQI.

5. The method of claim 4, further comprising:
    waking to enable processing of downlink information at the first subframe of the next on-duration; and
    reporting the CQI based on the CQI measurement from the last subframe of the previous active time at the first subframe of the next on-duration.

6. An apparatus for a wireless communication, comprising:
    means for determining whether a channel quality indicator (CQI) is to be reported during a first subframe immediately after a start of a next on-duration, an on-duration being a duration over which a downlink control channel is monitored every discontinuous reception (DRX) cycle;
    means for scheduling a wake-up time for reporting the CQI when the CQI is to be reported during the first subframe immediately after the start of the next on-duration; and
    means for reporting the CQI based on a reference subframe,
    wherein the CQI is reported based on the reference subframe during the first subframe immediately after the start of the next on-duration when the scheduled wake-up time is greater than a sum of a number of subframes used to generate a CQI report and a predetermined warm-up duration, and less than a maximum time allowed between a CQI measurement and the CQI report.

7. The apparatus of claim 6, further comprising:
    means for waking to enable processing of downlink information at the first subframe of the next on-duration when the CQI is determined not to be reported during the first subframe immediately after the start of the next on-duration.

8. The apparatus of claim 6, further comprising:
    means for waking to enable processing of downlink information at a subframe that is a particular number of subframes immediately before the start of the next on-duration when the scheduled wake-up time at least is not greater than the sum of the number of subframes used to generate the CQI report and the predetermined warm-up duration, or is not less than the maximum time allowed between the CQI measurement and the CQI report, wherein the particular number of subframes is equal to the number of subframes used to generate the CQI report; and
    means for reporting the CQI based on the processed downlink information at the first subframe of the next on-duration.

9. The apparatus of claim 6, wherein the reference subframe is a last subframe of a previous DRX cycle active time, and
    wherein the means for reporting the CQI based on the reference subframe is configured to:
    use a CQI measurement from the last subframe of the previous active time as a basis to report the CQI.

10. The apparatus of claim 9, further comprising:
    means for waking to enable processing of downlink information at the first subframe of the next on-duration; and means for reporting the CQI based on the CQI measurement from the last subframe of the previous active time at the first subframe of the next on-duration.

11. An apparatus for a wireless communication, comprising:
a processing system configured to:
determine whether a channel quality indicator (CQI) is to be reported during a first subframe immediately after a start of a next on-duration, an on-duration being a duration over which a downlink control channel is monitored every discontinuous reception (DRX) cycle;
schedule a wake-up time for reporting the CQI when the CQI is to be reported during the first subframe immediately after the start of the next on-duration; and
report the CQI based on a reference subframe,
wherein the CQI is reported based on the reference subframe during the first subframe immediately after the start of the next on-duration when the scheduled wake-up time is greater than a sum of a number of subframes used to generate a CQI report and a predetermined warm-up duration, and less than a maximum time allowed between a CQI measurement and the CQI report.

12. The apparatus of claim 11, the processing system further configured to:
wake to enable processing of downlink information at the first subframe of the next on-duration when the CQI is determined not to be reported during the first subframe immediately after the start of the next on-duration.

13. The apparatus of claim 11, the processing system further configured to:
wake to enable processing of downlink information at a subframe that is a particular number of subframes immediately before the start of the next on-duration when the scheduled wake-up time at least is not greater than the sum of the number of subframes used to generate the CQI report and the predetermined warm-up duration, or is not less than the maximum time allowed between the CQI measurement and the CQI report, wherein the particular number of subframes is equal to the number of subframes used to generate the CQI report; and
report the CQI based on the processed downlink information at the first subframe of the next on-duration.

14. The apparatus of claim 11, wherein the reference subframe is a last subframe of a previous DRX cycle active time, and
wherein the processing system configured to report the CQI based on the reference subframe is further configured to:
use a CQI measurement from the last subframe of the previous active time as a basis to report the CQI.

15. The apparatus of claim 14, the processing system further configured to:
wake to enable processing of downlink information at the first subframe of the next on-duration; and
report the CQI based on the CQI measurement from the last subframe of the previous active time at the first subframe of the next on-duration.

16. A non-transitory computer-readable medium comprising code for a wireless communication, comprising code for: determining whether a channel quality indicator (CQI) is to be reported during a first subframe immediately after a start of a next on-duration, an on-duration being a duration over which a downlink control channel is monitored every discontinuous reception (DRX) cycle; scheduling a wake-up time for reporting the CQI when the CQI is to be reported during the first subframe immediately after the start of the next on-duration; and reporting the CQI based on a reference subframe, wherein the CQI is reported based on the reference subframe during the first subframe immediately after the start of the next on-duration when the scheduled wake-up time is greater than a sum of a number of subframes used to generate a CQI report and a predetermined warm-up duration, and less than a maximum time allowed between a CQI measurement and the CQI report.

17. The non-transitory computer-readable medium of claim 16, the computer-readable medium further comprising code for: waking to enable processing of downlink information at the first subframe of the next on-duration when the CQI is determined not to be reported during the first subframe immediately after the start of the next on-duration.

18. The non-transitory computer-readable medium of claim 16, further comprising code for: waking to enable processing of downlink information at a subframe that is a particular number of subframes immediately before the start of the next on-duration when the scheduled wake-up time at least is not greater than the sum of the number of subframes used to generate the CQI report and the predetermined warm-up duration, or is not less than the maximum time allowed between the CQI measurement and the CQI report, wherein the particular number of subframes is equal to the number of subframes used to generate the CQI report; and reporting the CQI based on the processed downlink information at the first subframe of the next on-duration.

19. The non-transitory computer-readable medium of claim 16, wherein the reference subframe is a last subframe of a previous DRX cycle active time, and wherein the code for reporting the CQI based on the reference subframe further comprises code for: using a CQI measurement from the last subframe of the previous active time as a basis to report the CQI.

20. The non-transitory computer-readable medium of claim 19, further comprising code for: waking to enable processing of downlink information at the first subframe of the next on-duration; and reporting the CQI based on the CQI measurement from the last subframe of the previous active time at the first subframe of the next on-duration.

* * * * *